United States Patent

[11] 3,594,659

[72] Inventors Hanspeter Brandli
  Munchenbuchsee;
  Rene Dandliker, Munsingen, both of,
  Switzerland
[21] Appl. No. 697,488
[22] Filed Jan. 12, 1968
[45] Patented July 20, 1971
[73] Assignee Institut fur Angewandte Physik der Universitat
  Bern, Bern, Switzerland
[32] Priority Feb. 8, 1967
[33] Switzerland
[31] 1,878/67

[54] DEVICE FOR THE FREQUENCY STABILIZATION OF A GAS LASER OSCILLATOR
3 Claims, 5 Drawing Figs.
[52] U.S. Cl. .................................................. 331/94.5,
  250/199, 330/4.3
[51] Int. Cl. .................................................. H01s 3/10,
  H01s 3/22
[50] Field of Search .......................................... 331/94.5;
  250/199; 330/4.3

[56] References Cited
UNITED STATES PATENTS
3,361,990 1/1968 Gordon et al. ................. 331/94.5
FOREIGN PATENTS
1,350,398 12/1963 France ......................... 331/94.5
OTHER REFERENCES
Gordon and White, " Single Frequency Gas Lasers at 6328 A°," PROC. IEEE, February, 1964, pp. 206—7

White et al., " Frequency Stabilization of Single Mode Gas Lasers," APP. PHYS. LETT 5, (5), 1 Sep. 64, pp. 97—8
Tobias et al., " Derivation of a Frequency-Sensitive Signal from a Gas Laser in An Axial Magnetic Field," APP. PHYS. LETT., 6, (10), May 15, 65, pp. 198—200
White, " A Two-channel Laser Frequency Control System," IEEE J. QUANT. ELECTR. QE-1, October, 1965, pp. 332−3
Brandli et al., " Absolute Frequency Stabilization of a Gas Laser Using Optical Resonance Amplification Techniques," IEEE J. QUANT. ELECTRI. QE-2, June 1966, pp. 152— 3
White, " Pressure and Current Dependent Shifts ... Ne Transition," APP. PYS. LETT. 10, (1), 1 Jan. 67, pp. 24—26.
Bloom, " Gas Lasers," APPL. OPTICS, 5, (10), Oct. 66, pp. 1500, 1508, and 1509.

*Primary Examiner*—Ronald L. Wibert
*Assistant Examiner*— R. J. Webster
*Attorney*—Ernest F. Marmorek ABSTRACT: A device for the frequency stabilization of a gas laser oscillator, wherein the oscillator is formed by a laser between two reflectors, the laser consisting of a tube filled with helium and neon, the latter free of isotopes. An error signal is obtained corresponding to the deviation of a resonant frequency from its standard value in that a right and a left circularly polarized component of the laser beam are absorbed when passing the tube wherein a magnetic field and a gas discharge are maintained. Absorption of the two components occurs to different degree due to the Zeeman effect, and a magnitude corresponding to this difference is established as a function of the frequency. The error signal controls the distance of the two reflectors from each other.

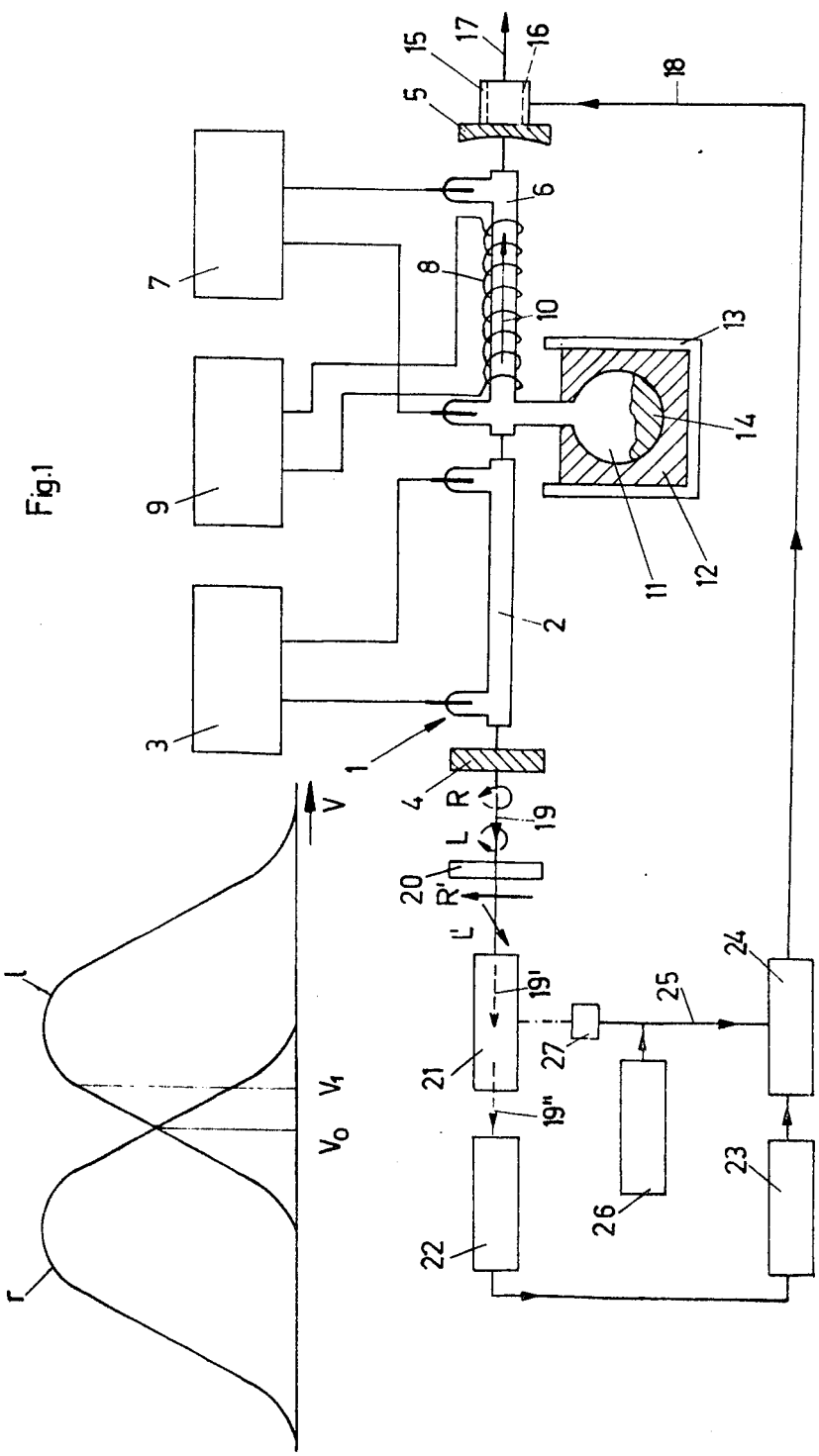

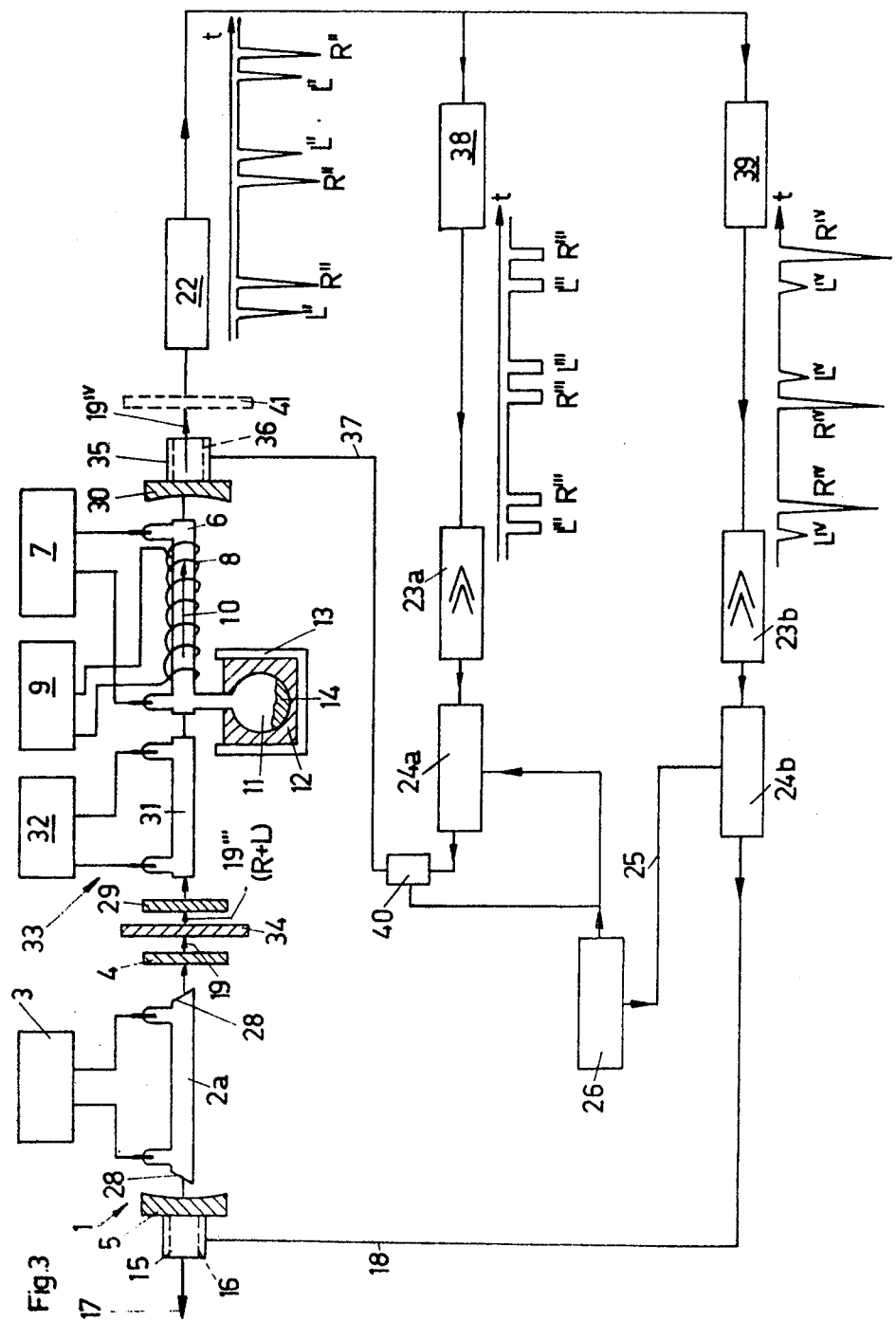

DEVICE FOR THE FREQUENCY STABILIZATION OF A GAS LASER OSCILLATOR

The invention relates to a device for the frequency stabilization of a gas laser oscillator wherein an error signal corresponding to a deviation of the resonant frequency from its set or standard value is obtained in such a manner that a right circularly and a left circularly polarized component of a laser beam are absorbed when passing an absorption tube which contains a gas free of isotopes and in which a magnetic field and a gas discharge are maintained. The absorption occurs to different degrees due to the Zeeman effect, and, as a function of the frequency, a magnitude corresponding to this difference is established, and the error signal controls the mutual distance of the oscillator reflectors in dependence of the decreased deviation.

A gas laser oscillator, in this disclosure, denotes a self-sustained device wherein the light-intensifying, gas-containing tube of the laser is disposed between two reflectors.

In a known device of this kind, the absorption tube is outside the oscillator and the right and left circularly polarized components of the laser beam meet, after a single pass through the absorption tube, a photoelectron amplifier whose starting impulse, after amplification and demodulation, yield the error signal. It is a disadvantage of this device that high absorption is required in order to attain a sufficient difference between the impulses corresponding to the right and left circularly polarized components, and that this high absorption in the tube requires a comparatively high discharge current density and can be obtained only within a narrow pressure range. This, in turn, means that it is very difficult and even practically impossible to control the state of the tube so that the dependence of the absorption frequency of the two components does not change with the course of time. In particular, it is impossible to reproduce exactly the state of the tube. Such reproducibility is required for absolute frequency stability and for the use of the device for the definition of a standard wavelength, e.g., as a substitute for the krypton standard wavelength.

It is the object of the invention to avoid these drawbacks by disposing the tube containing an isotope-free gas between two reflectors so that the laser beam passes the tube repeatedly. Furthermore, a device is connected to this tube which maintains constant gas pressure; and a further device is provided which keeps the discharge current constant. Because comparatively slight absorption is required owing to the repeated passage of the beam, a pressure may be selected within the tube which can be kept quite constant without major effort. Moreover, the discharge current may be kept low, and this facilitates constancy of the discharge current and materially reduces aging effects.

The invention now will be more fully explained with reference to the accompanying drawings. However, it should be understood that these are given merely by way of illustration, and not of limitation, and that it intended to cover all variations and modifications which do not constitute a departure from the spirit and scope of the invention as hereinafter claimed.

In the drawings,

FIG. 1 is an elevation, in schematic, of a first frequency stabilization device;

FIG. 2 is a graphic representation of the effect of the device of FIG. 1;

FIG. 3 is a schematic of a second embodiment of a frequency stabilization device;

Figure 4:
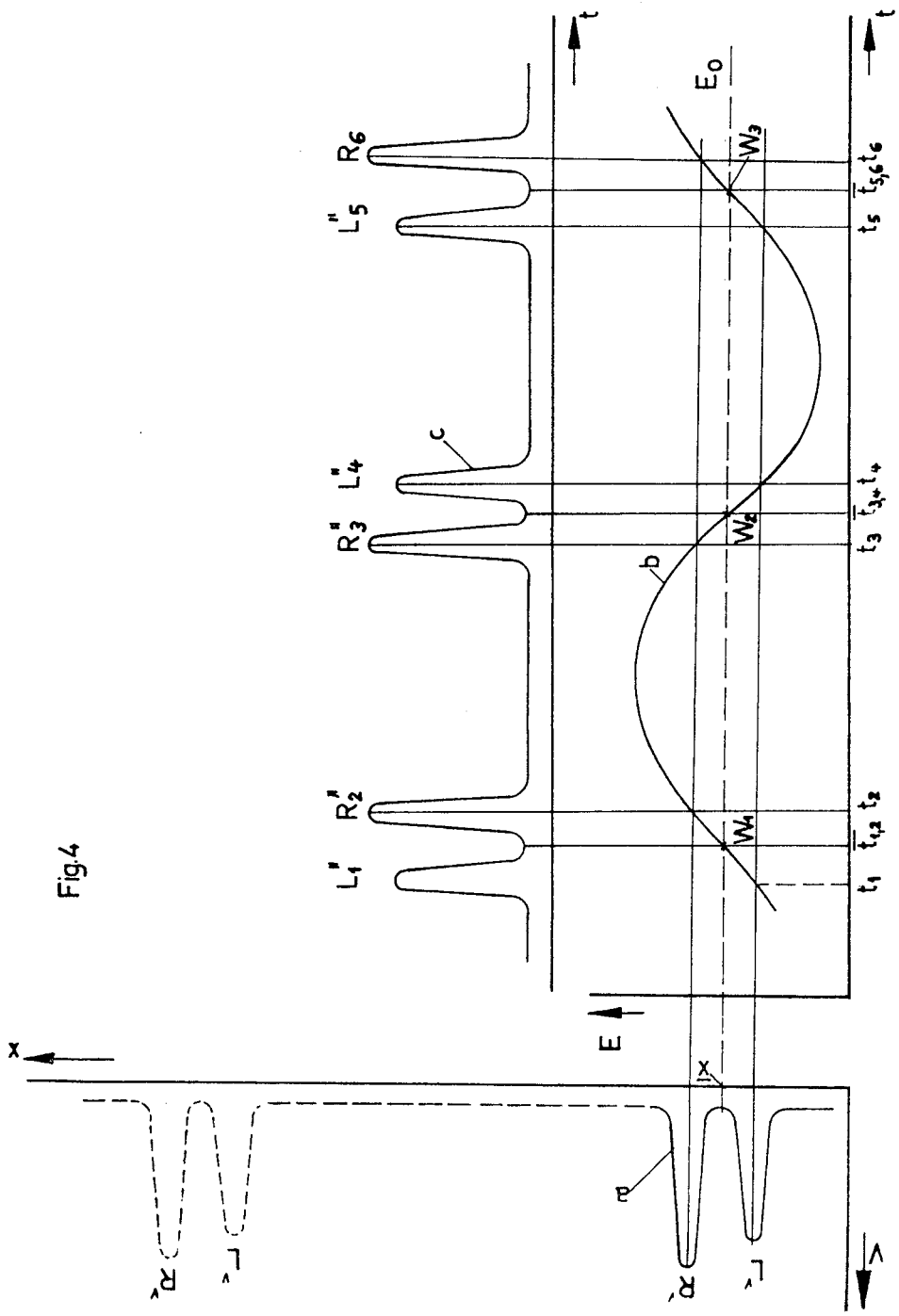
FIGS. 4 and 5 are diagrammatic presentations of the functions of the device shown in FIG. 3.

Referring now to these drawings, the gas laser 1 in the device according to FIG. 1 consists of a tube 2 filled with helium and neon and of a stabilized direct current (DC) source 3 which has a voltage of approximately 2—3 kv. and maintains a gas discharge in tube 2.

The ratio of He:Ne is chosen, e.g., as 5:1, and the pressure is substantially 1—2 torr. Tube 2 is disposed between two reflectors 4 and 5, respectively, which complete the laser to an oscillator. The oscillator is in resonance to a definite wavelength of the rays which may be amplified by laser 1, in the case at hand for instance to visible rays whose wavelength is in a narrow range near $0.63\mu$, at which the reflectors 4 and 5 are highly reflective. The true wavelength and the resonance frequency, respectively, of the oscillator 1, 4, 5, thus depend on the optical distance between the reflectors 4 and 5 which, in turn, depends from the geometrical distance therebetween (which, due to temperature fluctuations is not absolutely constant) and from the index of refraction of the helium-neon mixture in the tube. This index of refraction also changes on account of aging effects of the tube. The device shown in FIG. 1 has the purpose that the resonance frequency V of oscillator 1, 4, 5 is stabilized to a predetermined value $V_0$, independent of the influences named. For this purpose, a tube 6, containing isotope-free neon is disposed between tube 2 and reflector 5, i.e., the tube 6 contains either pure neon-20 or pure neon-22. Because these two isotopes differ slightly in their absorption characteristics, their purity is important for reproducibility. A gas discharge is maintained in tube 6 by means of a stabilized DC source 7. The neon pressure in tube 6 is approximately 2 to 40 torr and is kept absolutely constant in a manner explained below. The DC source 7 produces approximately 2—3 kv.

Tube 6 is surrounded by a coil 8 which is fed by a DC source 9 and maintains an axial magnetic field 10 in the tube of approximately 100 oersteds. Tube 6 is connected to a vessel 11 which is surrounded by a Dewar vessel 13 which is filled with liquid hydrogen 12. At the boiling temperature of liquid hydrogen at atmospheric pressure, i.e., at 20.3° K, a portion 14 of the neon in vessel 1 is in solid state. Thereby, the neon pressure in tube 6 is kept absolutely constant.

Reflector 5 is mounted on a piezoelectric element 15 which has a central bore 16 for the passage of an effective light beam 17, generated by the laser oscillator 1, 4, 5. It should be pointed out that the reflectors 4 and 5 in the resonance wave region, i.e., approximately $0.63\mu$, have a transparency of approximately 1 percent. Element 15 is connected to a conduit 18 which supplies a direct current potential from which the length of the element depends and thus the distance of reflector 4 from reflector 5, by fastening the end of the element 15, shown as the right end in FIG. 1, to a support (not shown). The voltage fed to element 15 is controlled in a manner explained below so that the optical path governing the frequency V of the laser oscillator between reflectors 4 and 5 is kept constant at a value in conformity with the predetermined value $V_0$.

A second beam 19 emerges from the laser oscillator 1, 4, 5 through reflector 4. The beam 19, like the effective light beam 17, consists of two oppositely circularly polarized components, shown schematically in the drawing, the left component being shown as L, the right one as R. Due to the Zeeman effect, these two components L and R are absorbed in tube 8 in differently frequency-depending manner and hence generally are of different size.

Beam 19 traverses a plate 20 consisting of a doubly refracting material and of such a thickness that the ordinary and extraordinary beam, after this transverse, exhibit a phase difference of 90°. This has the effect that at the exit of plate 20 the beam 19' consists of two linearly polarized components R' and L' which are at right angles to each other and correspond to the circularly polarized components R and L.

Beam 19' passes a rotating polarizer, e.g., a Nichol prism, and is collected by a photocathode (not shown) of an electron multiplier 22 as input signal 19''. However, when the components R' and L' are of different size, the input signal is modulated with twice the rotational frequency of polarizer 21.

As will be explained below, this modulation constitutes an error signal which must be eliminated in order to maintain the oscillator frequency V at the predetermined value $V_0$.

The outlet of the multiplier 22 is connected to a synchronized amplifier 23, i.e., it has a narrow amplifying band. The outlet of amplifier 23, in turn, is connected to a phase-sensitive demodulator 24. The latter determines the amplitude of modulation of beam 19''. In order to enable demodulator 24 also to determine which of the two components R' and L' is the larger, a voltage must be fed to it by way of conduit 25 which varies synchronously with the modulation frequency, i.e., twice the rotational frequency, of polarizer 21. This voltage is delivered from an alternating current (AC) source 26 of, e.g., substantially 50—500 Hz. which also feeds a synchronous motor 27, rotating the polarizer 21. The output signal of demodulator 24 which may be positive or negative, depending upon which of the components R or L prevails, is carried to the piezoelectric element 15 via conduit 18.

Curve $r$ in FIG. 2 shows the absorption of the neon in tube 6 for component R, and curve $l$ shows the corresponding absorption for component L, as a function of the frequency V. The intersection of curves $r$ and $l$ is at the frequency $V_0$ to which the laser oscillator is to be stabilized. When the actual frequency deviates from the standard frequency $V_0$, e.g., is at $V_1$, the following occurs:

Because, according to FIG. 2, at the assumed position of $V_1$ the component L is more strongly absorbed than component R, the input signal 19'' of electron multiplier 2 is modulated with twice the rotational frequency of polarizer 21, and demodulator 24 carries to element 15 a DC voltage error signal whose indication is of such a nature that the length of element 15 is shortened, so that the resonance frequency of the laser oscillator 1, 4, 5 is reduced. The reverse is true when the actual value of frequency V is too small.

Because the position of the absorption curves $r$ and $l$ along the V-axis is unchangeable, owing to the constancy of the neon pressure and that of the discharge current, the frequency $V_0$ can be kept constant with extraordinary exactness for long periods of time. Considering all possible sources of error, it can be estimated from the available construction components that the frequency constant of the device according to the invention $dV/V_0$ equals $10^{19}$, i.e., is higher by two orders of magnitudes than hitherto attained with conventional devices for the stabilization of gas laser oscillators to an absolute set value $V_0$. In addition, the critical operational conditions of the neon tube 6 are exactly reproducible and invariable over long periods of time.

Under certain conditions, it may be opportune to interpose in conduit 18, i.e., between demodulator 24 and piezoelectric element 15, an integrating element, e.g., a condenser inserted in parallel, in order to avoid override or overload.

FIG. 3 is a second embodiment of the invention, and like reference characters are used for like parts as in FIG. 1. Again, the He-Ne-laser 1 is disposed between reflectors 4 and 5 so that an oscillator 1, 4, 5 is formed whose resonance frequency is to be stabilized. The absorption neon tube 6, in this embodiment, is outside the laser oscillator; the arrangements of 6 to 14 correspond to that in FIG. 1. Tube 2a of laser 1 differs from tube 2 in that it is provided with windows 28. These windows are disposed at the ends of the tube 2a and are inclined at an acute angle $\alpha$, relative to the axis to the tube, whereby $\alpha$ equals 90—$\beta$, and $\beta$ is the Brewster angle. Consequently, of the two components, laterally polarized relative to each other, of the beams reflected back and forth between reflectors 4 and 5, only one component passes windows 28 practically unimpaired, whereas the other is weakened so much by reflection on window 28 that an amplification in oscillator 1, 4, 5 is precluded. Therefore, the oscillator yields linearly polarized light which may be imagined as composed of a right and a left circularly polarized component R and L, whereby, however, these components necessarily are of like magnitude.

Neon tube 6 is disposed between two reflectors 29 and 30. Between reflector 29 and tube 6, a helium-neon tube 31 is disposed which is connected to a stabilized DC source 32 and forms a laser 33 therewith. Laser 33 and the reflectors 29 and 30 constitute a feedback laser amplifier whose feedback, in contrast to that of an oscillator, is too weak to facilitate self-oscillation. The input signal for laser amplifier 33, 29, 30 is a light beam 19''' which is obtained from the input beam 19 of laser oscillator 1, 4, 5 by passing through reflector 4, a reducer 34 and reflector 29. Although the elements 4, 34, 29, are shown in the drawing at a slight distance from each other to give a better understanding of the operating principles, the reflectors 4 and 29 in practice are disposed directly on the reducer 34 which may consist, e.g., of colored glass plates, or they may themselves form the reducer which serves to avert undesirable reaction of the amplifier on the oscillator.

Reflector 30 is fastened to a piezoelectric element 35 which has a bore 36 for passage of the intensified beam $19^{IV}$. The latter produces the error signal in a manner which will be explained below. A DC voltage influencing the length of element 35 and modulated by an AC voltage is conducted to element 35 by way of conduit 37. This modulated voltage serves to adjust the distance of reflector 29 from reflector 30 to the frequency of the input light signal 19''', so that the feedback amplifier furnishes high amplification of this signal. The modulation is provided for reasons explained below.

If the frequency V of the laser beam deviates from the standard value $V_0$, the output signal $19^{IV}$ contains circularly polarized components of unequal size although, as mentioned, the output signal 19''' has equal circularly polarized components R and L. This is due to the different absorption of the neon and thus the different total resonance amplification for the R and L components so far as the frequency deviates from $V_0$, as has been shown with reference to FIG. 2. Maximal amplification of the amplifier 33, 29, 30 for the R and L components does not occur at like frequency so that, owing to the modulation of the voltage carried to piezoelectric element 35, the maximal amplification of the two components suffers a time lag relative to each other. This will be more fully shown with reference to FIG. 4. This enables elimination of the rotating polarizer 41 in this embodiment and to conduct the output signal $19^{IV}$ directly to the photoelectron multiplier 22. The latter thus furnishes output impulses R'' and L'' which are shifted relative to time and correspond to the components R and L, i.e., to the input of a limiter amplifier 38 and to the input of a magnifying amplifier 39.

Amplifier 38 adapts the two signals to each other, i.e., it yields two practically equal rectangular impulses R''' and L'''. Amplifier 39 magnifies the amplitude between its input signals so that two acute output impulses $R^{IV}$; $L^{IV}$ are generated whose difference in amplitude is considerably greater than that of the impulses R'' and L''.

The impulses R''' and L''' are carried to a synchronized amplifier 23a which is connected to a phase-sensitive demodulator 24a. The impulses $R^{IV}$ and $L^{IV}$ are carried to a synchronized amplifier 23b, connected to demodulator 24b. Both these demodulators are connected to AC voltage source 26, e.g., an oscillator of approximately 1 kHz. frequency. The output of demodulator 24a is connected to a superheterodyne network 40 wherein the output voltage of demodulator 24a is superposed with the AC voltage of source 26. The output voltage of network 40 is carried to element 35 by way of conduit 37. The output of demodulator 24b is connected to element 18 via conduit 18.

Curve $a$ in FIG. 4 shows the course of the amplification V of the feedback amplifier 33, 29, 30 as a function of the geometrical distance X of the two reflectors 29 and 30. The curve has a maxima $R^V$ and $L^V$ which corresponds to the components R and L. These maxima are at different distances X because the occurrence of a maximum is not governed by the geometrical distance between the reflectors 29 and 30, but by their optical distance which, in turn, depends on the index of refraction of the neon which, owing to the Zeeman effect, has slightly different values for the R and the L component. The part of the curve shown in a broken line indicates that these maxima repeat at distances of $\lambda/2$ if the length X changes by $\lambda/2$ or more, whereby $\lambda$ is the wavelength of the laser beam. Curve $a$ has been drawn with the presumption that the oscillator frequency V does not coincide with the standard value $V_0$. If the latter is the case, the maxima $R^V$ and $L^V$ are of equal size.

Curve $b$ shows the control voltage E carried to the piezoelectric element 35 by way of conduit 37 as a function of the time $t$, whereby voltage E is composed of the DC voltage $E_0$ from demodulator 24a, superposed with an AC voltage of frequency $f$, furnished by source 26 and superposed in heterodyne network 40.

The DC voltage $E_0$ itself is composed of a prime potential and a demodulating potential.

Curve $c$ shows the time sequence of the impulses $R''$ and $L''$ delivered by the electron multiplier.

Control voltage E modulates the geometrical and thus also the optical length of the feedback amplifier 33, 29, 30 which ensures that the frequency V of the light signal 19, furnished by laser oscillator 1, 4, 5 actually is, at least with respect to time, within the very narrow amplifying range of amplifier 33, 29, 30 because the entire device otherwise would not be operational. To widen the range would entail loss of amplification which instantly is not tolerable.

Curves $a$, $b$ and $c$ correspond to the actually unattainable ideal state wherein demodulator 24a yields no error signal, i.e., no demodulation product, and potential $E_0$ thus is merely a primary voltage. At time $t_1$, length X is so large that the amplification for component L has the maximum $L^V$, and the corresponding impulse $L_1''$ is generated in multiplier 22. Maximum $R^V$ corresponds to time $t_2$, as does impulse $R_2''$; time $t_3$ corresponds to $R^V$ and $R_3''$, and so on. Turning points $W_1$, $W_2$, $W_3$ of curve $b$ correspond to the median values $\bar{t}_{1,2}$, $\bar{t}_{3,4}$, $\bar{t}_{5,6}$......of of $t_1$ and $t_2$, $t_3$ and $t_4$, $t_5$ and $t_6$ etc., and the median value $\bar{x}$ between the values for X for which the maxima $L^V$, and $R^V$ occur. When the impulses $L_1''$, $R_2''$, $R_3''$, $L_4''$ etc., are limited to equal height by limiter amplifier 38, it is evident that at a Fourier's analysis of the correspondingly changed curve $c$ (i.e., at equal light of all maxima), a Fourier component of a frequency $f$, it furnishes no input signal to demodulator 24a.

When the length X does not coincide with the value $\bar{x}$, i.e., when the turning points $W_1$, $W_2$, $W_3$ are not in the center of $L^V$ and $R^V$, the impulses $L_1''$, $R_2''$, $R_3''$, $L_4''$, $L_5''$, $R_6''$ also are shifted timewise relative to these turning points so that after the impulse limitations the sequence of the impulses $R'''$, $L'''$ has a Fourier component of the frequency $f$ which furnishes a demodulation product whose plus or minus sign depends on the phase of this Fourier component relative to the AC voltage of frequency $f$, coming directly from source 26. By algebraic addition of the modulation product to the primary voltage the DC voltage $E_0$ then is enlarged or decreased so that thereby length X is changed as desired, i.e., approaches $\bar{x}$.

Amplifier 23b to which the superelevated pulses $R^{IV}$, $L^{IV}$ are carried, also is synchronized to the frequency $f$ of voltage sources 26. The Fourier analysis of the impulse series $R^{IV}$, $L^{IV}$ only is free of the group frequency which equals frequency $f$, when impulses $R^{IV}$ and $L^{IV}$ are alike.

The positive or negative DC voltage, furnished by the phase-sensitive demodulator 24b as demodulation product and carried to the piezoelectric element 15 via conduit 18, serves in the same manner to compensate deviations of the actual frequency of oscillator 1, 4, 5 from its standard frequency $V_0$ as described by FIG. 2 for the device according to FIG. 1. As long as the oscillator frequency V deviates from standard value $V_0$, the maxima $L^V$, $R^V$ differ from each other and thus also the impulses $R^{IV}$, $L^{IV}$, and element 15 receives an error signal which corrects the distance between reflectors 4 and 5. At the standard frequency $V_0$, the impulses $R^{IV}$, $L^{IV}$ become equal and the error signal disappears.

Figure 5:
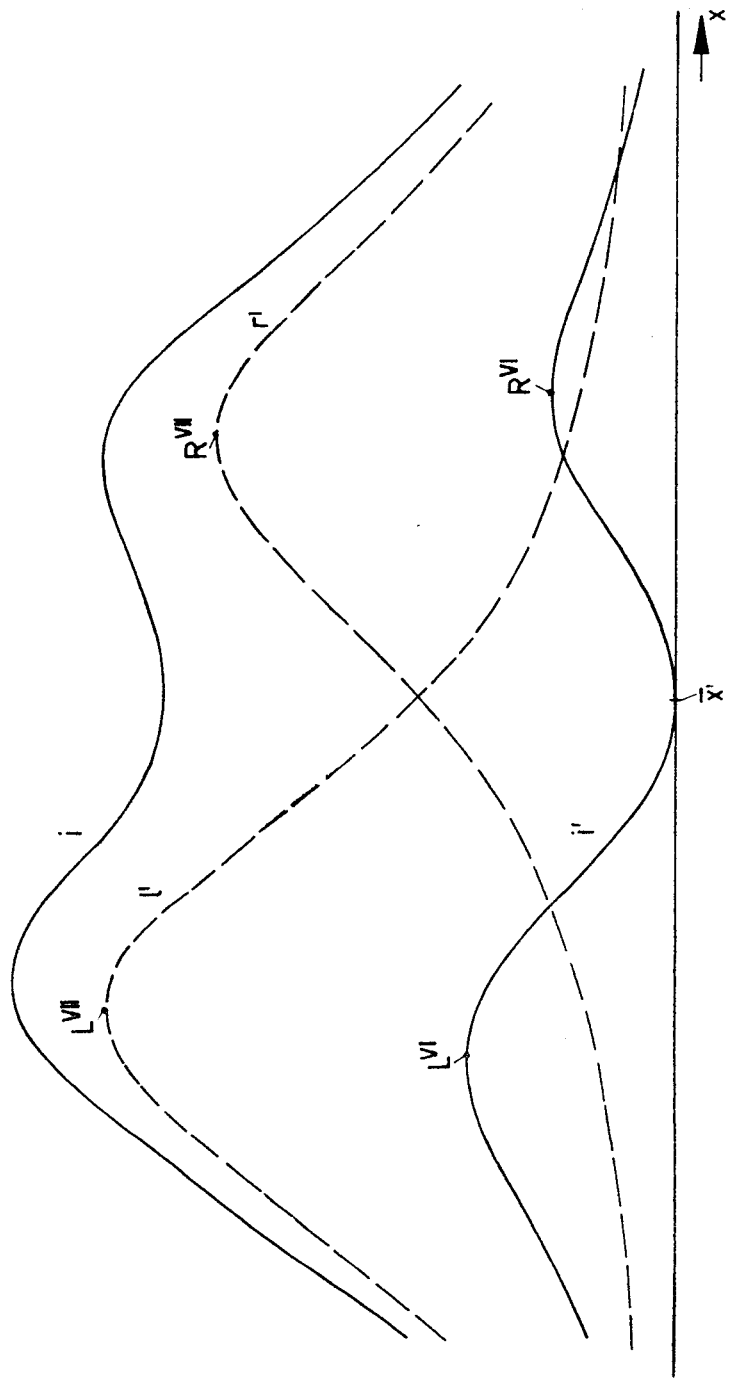

In FIG. 4 it is presumed that the maxima $R^V$, $L^V$ of the amplification V are well separated from each other. However, this need not always be the case and amplification V for the R and L components may take a course as shown by curves $r'$ and $l'$ in FIG. 5. The intensity of the sum of the two components is shown as curve $i$. An output signal corresponding to curve $i$ of the electron multiplier 22 is not usable. In order to separate the two maxima of curve $i$ sharply, a linear polarizer 41 (shown in broken lines in FIG. 3) may be connected between multiplier 22 and element 35. The plane of polarization of 41 is vertical to that of the beam produced by laser oscillator 1, 4, 5. At point $\bar{x}$, where the amplification V, according to curves $l'$ and $r'$ has the same value, the light intensity becomes zero. Curve $i'$ shows the course of the light intensity behind polarizer 41. The maxima $R^{IV}$, $L^{IV}$ now are sharply separated from each other and their height difference, relative to their median height, is greater than the height difference of the maxima $R^{VII}$ and $L^{VII}$ of curves $r'$ and $l'$, relative to its height. Otherwise, the device functions as described above.

What we claim is:

1. A device for the frequency stabilization of a gas laser oscillator which comprises a laser including a tube containing helium and neon and a stabilized direct current source maintaining a gas discharge in said laser tube; an absorption tube containing isotope-free neon; means for maintaining respectively a gas discharge, a magnetic field, and constant gas pressure in said absorption tube; two reflectors, movable relative to each other, between which said laser tube and said absorption tube are disposed; said laser and reflectors constituting an oscillator having a resonance frequency controlled by the length of the optical path between said reflectors; the beam of said laser repeatedly traversing said absorption tube, means for creating two components of said beam, one being right and the other left circularly polarized; said components being absorbed in said tube to different degrees due to the Zeeman effect, and according to said frequency to produce an error signal corresponding to a deviation in said resonance frequency from a required value thereof, and control means responsive to said error signal and operative to control the mutual distance of said reflectors, by decreasing said produced deviation, means for maintaining the discharge current in said absorption tube constant, and wherein a second laser is disposed between the first laser and said absorption tube, and two additional reflectors are interposed between the said first and second lasers, an optical feedback amplifier, and means operable for connecting the output of said second laser to said optical feedback amplifier, wherein further means are provided to convert said two components into linearly polarized components, these means comprising a plate of double refracting material; a rotating polarizer, a photoelectron multiplier, a synchronized amplifier, a first phase-sensitive demodulator, and a first piezoelectric element, said components being further carried to said rotating polarizer, thence to said photoelectron multiplier, the latter furnishing twice the rotational frequency of the polarizer and, thus, a modulated output signal; said signal being amplified by an accordingly synchronized amplifier; said amplifier furnishing a further output signal; said further signal being carried to a phase-sensitive demodulator, therein to be demodulated to generate an error signal; and a piezoelectric element controlled by said error signal for changing the mutual distance of said reflectors, a further amplifier, a limiter amplifier, a second demodulator, and a second piezoelectric element, said oscillator furnishing a linearly polarized laser beam, amplified in said optical feedback amplifier and carried to said multiplier; the output of said multiplier being connected to said limiter amplifier, said limiter amplifier feeding said further amplifier which is synchronized to a given modulation frequency $f$ and whose output signal is demodulated on said second demodulator; the output of said second demodulator being superposed with an alternating current voltage and carried to said second piezoelectric element; said second piezoelectric element controlling the mutual distance of said additional reflectors.

2. The device as defined in claim 1, wherein a linear polarizer is interposed between said multiplier and said second piezoelectric element, the plane of polarization of said polarizer being vertical relative to that of the linearly polarized laser beam.

3. The device as defined in claim 1, a magnifying amplifier, a phase-sensitive third demodulator, and a third amplifier, the output of said multiplier being connected to said magnifying amplifier which feeds said third amplifier synchronized to said given modulation frequency; the output signal of said third amplifier being demodulated in said phase-sensitive third demodulator; the demodulated output being carried to said first piezoelectric element to control the mutual distance of said reflectors.